(12) United States Patent
Leslie et al.

(10) Patent No.: US 10,563,379 B2
(45) Date of Patent: Feb. 18, 2020

(54) SYSTEM AND METHOD OF IDENTIFYING A PAYLOAD DESTINATION

(71) Applicant: CQMS Pty Ltd, Murarrie, Queensland (AU)

(72) Inventors: Bruce Alexander Leslie, Goodna (AU); Michael Stoodley, Goodna (AU)

(73) Assignee: CQMS PTY LTD, Murarrie, Queensland (AU)

(*) Notice: Subject to any disclaimer, the term of this patent is extended or adjusted under 35 U.S.C. 154(b) by 159 days.

(21) Appl. No.: 15/539,641

(22) PCT Filed: Dec. 24, 2014

(86) PCT No.: PCT/AU2014/050451
§ 371 (c)(1),
(2) Date: Jun. 23, 2017

(87) PCT Pub. No.: WO2016/101004
PCT Pub. Date: Jun. 30, 2016

(65) Prior Publication Data
US 2017/0370074 A1    Dec. 28, 2017

(51) Int. Cl.
*E02F 9/26* (2006.01)
*G08B 21/18* (2006.01)
*G01G 19/12* (2006.01)
*G01G 19/08* (2006.01)

(52) U.S. Cl.
CPC ........... *E02F 9/26* (2013.01); *G01G 19/083* (2013.01); *G01G 19/12* (2013.01); *G08B 21/182* (2013.01)

(58) Field of Classification Search
USPC ............................................. 701/50
See application file for complete search history.

(56) References Cited

U.S. PATENT DOCUMENTS

| | | |
|---|---|---|
| 4,839,835 A | 6/1989 | Hagenbuch |
| 5,067,572 A | 11/1991 | Kyrtsos |
| 6,211,471 B1 | 4/2001 | Rocke |
| 8,626,541 B2 | 1/2014 | Doan |
| 2004/0186687 A1* | 9/2004 | Ogura .............. E02F 9/205 702/185 |
| 2005/0000703 A1* | 1/2005 | Furuno .............. G01G 19/08 172/2 |
| 2007/0135985 A1 | 6/2007 | Berry |
| 2014/0132422 A1 | 5/2014 | Borland |
| 2014/0244101 A1* | 8/2014 | Chitty .............. E02F 9/2054 701/31.6 |

(Continued)

FOREIGN PATENT DOCUMENTS

CN     1603528 A    4/2005

*Primary Examiner* — Tyler D Paige
(74) *Attorney, Agent, or Firm* — Schwabe Williamson & Wyatt, PC (57) ABSTRACT

A system of identifying a payload destination, the system including: one or more sensors; and an identifying module configured to: receive a plurality of inputs from the one or more sensors, the plurality of inputs being associated with payload delivery from a lifting machine; define a plurality of input destination identifiers based on the plurality of inputs; compare the plurality of input destination identifiers with stored identifiers in order to establish one or more destination match estimates; and identify the payload destination based on the one or more destination match estimates.

21 Claims, 2 Drawing Sheets

(56) References Cited

U.S. PATENT DOCUMENTS

| | | | |
|---|---|---|---|
| 2014/0261152 A1* | 9/2014 | Tanaka | E02F 9/2033 116/230 |
| 2014/0336874 A1 | 11/2014 | Harshberger, II | |
| 2014/0358382 A1* | 12/2014 | Kou | E21C 47/00 701/50 |
| 2015/0376869 A1* | 12/2015 | Jackson | E02F 1/00 701/2 |
| 2016/0059854 A1* | 3/2016 | Ohsugi | B60W 10/20 701/50 |
| 2016/0155277 A1* | 6/2016 | Asada | B60C 19/00 701/70 |
| 2017/0113608 A1* | 4/2017 | Patel | B60Q 9/008 |
| 2017/0269591 A1* | 9/2017 | Tanaka | G05D 1/0088 |
| 2018/0106709 A1* | 4/2018 | Cherney | G07C 5/008 |

* cited by examiner

SYSTEM AND METHOD OF IDENTIFYING A PAYLOAD DESTINATION

CROSS-REFERENCE TO RELATED APPLICATION

The present application is a national phase entry under 35 U.S.C. § 371 of International Application No. PCT/US2014/050451, filed Dec. 24, 2014, entitled "A SYSTEM AND METHOD OF IDENTIFYING A PAYLOAD DESTINATION," which designates the United States of America, the entire disclosure of which is hereby incorporated by reference in its entirety and for all purposes.

FIELD OF THE INVENTION

The invention relates to a system and method of identifying a payload destination. In particular, the invention relates, but is not limited, to a system and method of identifying a payload destination used with an excavator.

BACKGROUND TO THE INVENTION

Reference to background art herein is not to be construed as an admission that such art constitutes common general knowledge in Australia or elsewhere.

Excavators on mining sites move payloads in the form of excavated material. The excavated material may be delivered to trucks, conveyor hoppers or other destinations, both productive and non-productive. The trucks deliver the excavated material to further destinations on the mining site.

Currently, excavators may weigh the payloads in the excavator before dumping them, and communicate with a truck when delivering a payload thereto. Communication between the excavator and the truck may allow the excavator to, for example, establish the payload weight that is delivered to the truck.

However, current excavator based weighing systems that do not communicate with the truck are unable to determine whether the payload picked up by the excavator is actually delivered to the truck. For example, part of the payload may be dumped back onto the ground during delivery to the truck, or the whole payload may be dumped onto the ground.

Furthermore, excavator communication systems cannot establish the destination of the payload. Determining the destination of a payload allows monitoring of payload transport productivity.

In addition, retrofitting a communication system to the truck may be expensive and, therefore, not commercially viable when a fleet of trucks require communication systems.

OBJECT OF THE INVENTION

It is an aim of this invention to provide a system and method of identifying a payload destination which overcomes or ameliorates one or more of the disadvantages or problems described above, or which at least provides a useful alternative.

Other preferred objects of the present invention will become apparent from the following description.

SUMMARY OF INVENTION

In one form, although not necessarily the only or broadest form, the invention resides in a system of identifying a payload destination, the system including:

one or more sensors; and
an identifying module configured to:
receive a plurality of inputs from the one or more sensors, the plurality of inputs being associated with payload delivery from a lifting machine;
define a plurality of input destination identifiers based on the plurality of inputs;
compare the plurality of input destination identifiers with stored identifiers in order to establish one or more destination match estimates; and
identify the payload destination based on the one or more destination match estimates.

Preferably, the one or more sensors and the identifying module are fitted to the lifting machine. Preferably, the lifting machine is in the form of an excavator.

Preferably, the identifying module is configured to identify a number of payload destinations. For example, the identifying module is configured to identify one payload destination that is initially in the form of a machine and then configured to identify a subsequent payload destination. Preferably, the subsequent payload destination is in the form of a collection site. Preferably, the payload destination may be assigned as a productive payload destination or a non-productive payload destination.

Preferably, the machine is in the form of a vehicle. Preferably, the vehicle is in the form of a truck.

Preferably, the one or more sensors include an audio sensor, a visual sensor, a movement sensor and/or a wireless receiver.

Preferably, the audio sensor includes a microphone. Preferably, the visual sensor includes a camera, radar and/or a laser scanner.

Preferably, the movement sensor is configured to measure movement. Preferably, the movement sensor is configured to measure movement of the lifting machine.

Preferably, the wireless receiver is configured to read a passive or active radio-frequency identification (RFID) tag.

Preferably, the plurality of input destination identifiers include a movement identifier, a visual input identifier, an audio input identifier and/or a wireless communication input identifier.

Preferably, the movement identifier includes movement/tramming of the lifting machine. Preferably, the movement/tramming is towards the machine and/or payload. Preferably, the movement identifier includes a height of lifting of the payload. Preferably, the height of lifting of the payload corresponds to a payload delivery height for the machine. Preferably, the movement identifier includes a direction heading for the lifting machine when dumping the payload. Preferably, the movement identifier includes movement of objects in the environment layout.

Preferably, the visual input identifier includes shape, colour, numerals, letters, barcodes and/or visual signals. Preferably, the visual input identifiers include shape, colour, numerals, letters, barcodes and/or visual signals of the payload. Preferably, the visual input identifiers include shape, colour, numerals, letters, barcodes and/or visual signals of the machine. Preferably, the visual input identifiers include shape, colour, numerals, letters, barcodes and/or visual signals of an environment layout.

Preferably, the audio input identifier includes audio signals, horn signals, machine engine noise and/or machine control inputs.

Preferably, the wireless communication input identifier includes a signal form a passive identification device and/or an active identification device.

Preferably, the identifying module is configured to gather the stored identifiers from payloads, machines and/or environment layouts. Preferably, in gathering the stored identifiers, the identifying module is configured to identify and record the stored identifiers from the payloads, machines and/or environment layouts. For example, the identifying module is configured to identify and record stored identifiers relating to the machine in the form of visual identifiers.

In a further form, in gathering the stored identifiers, the identifying module is configured to receive an upload defining the stored identifiers.

Preferably, the stored identifiers are compared to the plurality of input identifiers that are equivalent in form. For example, the stored identifiers may include a stored movement identifier that is equivalent in form to the movement input identifier, a stored visual identifier that is equivalent in form to the visual input identifier, a stored audio identifier that is equivalent in form to an audio input identifier and/or a stored wireless communication identifier that is equivalent in form to the wireless communication input identifier.

Preferably, the comparison between the plurality of input identifiers and stored identifiers includes assigning the plurality of input identifiers to the stored identifiers that are equivalent in form. Preferably, the plurality of input identifiers are assigned in a tabulated manner to their stored identifiers that are equivalent in form.

Preferably, the comparison between the plurality of input identifiers and stored identifiers includes determining a likelihood that the plurality of input identifiers correspond to the stored identifiers that are equivalent in form. Preferably, the likelihood is based on the similarities and/or differences between the plurality of input identifiers and the stored identifiers that are equivalent in form. For example, the calibration module may compare visual input identifies of the machine with stored identifiers in order to establish a likelihood of a machine identity. From the machine identity, a destination match estimate may be determined by, for instance, determining a payload delivery time of the machine. Preferably, the payload delivery time is associated with the collection site.

Preferably, the identifying module is configured to combine the likelihoods that the plurality of input identifiers correspond to the stored identifiers equivalent in form in order to establish the one or more destination match estimates.

Preferably, the identifying module determines the payload destination based on the highest estimate amongst the one or more destination match estimates.

Preferably, the identifying module is configured to estimate a payload delivery portion delivered to the payload destination. Preferably, the payload destination is the machine. Preferably, in estimating the payload delivery portion, the identifying module is configured to:

receive one or more delivery inputs from the one or more sensors, the one or more delivery inputs associated with the payload after delivery to the payload destination; and estimate the delivery portion based on the one or more delivery inputs.

Preferably, the one or more delivery inputs from the one or more sensors are in the form of visual inputs. Preferably, the visual inputs are in the form of the dumped location of the payload or portions thereof.

Preferably, the identifying module estimates the delivery portion based on one or more of the plurality of inputs and the one or more delivery inputs.

Preferably, the identifying module is configured to determine a dumping productivity factor from the payload delivery portion. Preferably, the dumping productivity factor relates to unproductive payload portions that are not delivered to the payload destination. For example, the dumping productivity factor relates to unproductive payload portions that are not delivered to the machine. In a further form, the dumping productivity factor relates to one or more payloads delivered to the non-productive payload destination.

Preferably, the system also includes a user interface. Preferably, the user interface outputs information from the identifying module. Preferably, the user interface also allows the user to input information into the identifying module. Preferably, the user is able to input a predetermined maximum payload weight the machine can carry, via the user interface, into the identifying module.

Preferably, the identifying module is configured to calculate a total payload weight delivered to the payload destination. Preferably, the total payload weight delivered to the payload destination is based on one or more payload delivery portions. Preferably, the identifying module is configured to calculate a total payload weight delivered to the payload destination in the form of the machine by determining when a final payload is delivered to the machine. Preferably, after the final payload is delivered to the machine, the machine moves to the subsequent payload destination. Preferably, the identifying module is configured to determine when the machine moves to the subsequent payload destination from one or more inputs from the one or more sensors.

Preferably, the identifying module indicates, via an alarm, when a predetermined maximum payload weight of the machine has been exceeded. Preferably, the alarm includes a visual alarm. Preferably, the visual alarm is indicated through a screen of the user interface. Preferably, the alarm includes an audio alarm. Preferably, the alarm is indicated through a speaker of the user interface.

Preferably, the identifying module records the total payload weight delivered to the machine in order to establish a total payload delivered to the payload destination. Preferably, from the total payload delivered to the payload destination, a payload destination productivity factor is determined by the identifying module. Preferably, the payload destination productivity factor relates to the subsequent payload destination.

In another form the invention resides in a method of identifying a payload destination, the method including the steps of:

defining a plurality of input identifiers based on a plurality of inputs received from one or more sensors, the plurality of inputs being associated with payload delivery from a lifting machine;

comparing the plurality of input identifiers and stored identifiers in order to establish one or more destination match estimates; and identifying the payload destination based on the one or more destination match estimates.

Preferably, the method includes identifying a number of payload destinations. Preferably, the method includes identifying one payload destination that is initially in the form of a machine and a subsequent payload destination. Preferably, the subsequent payload destination is in the form of a collection site. Preferably, the payload destination may be assigned as a productive payload destination or a non-productive payload destination.

Preferably, the step of defining the plurality of input identifiers based on the plurality of inputs received from the one or more sensors includes defining a movement identifier, a visual input identifier, an audio input identifier and/or a wireless communication input identifier.

Preferably, the method further includes gathering the stored identifiers. Preferably, the step of gathering the stored identifiers includes recording identifiers from payloads, machines and/or environment layouts in order to form the stored identifiers.

Preferably, the step of recording identifiers from the payloads, machines and/or environment layouts in order to form the stored identifiers includes recording an equivalent identifier to the plurality of input identifiers for comparison. For example, the step of recording the stored identifiers from the payloads, machines and/or environment layouts includes recording a stored movement identifier, a stored visual input identifier, a stored audio input identifier and/or a stored wireless communication input identifier.

Preferably, the step of comparing the plurality of input identifiers and stored identifiers, in order to establish the one or more destination match estimates, includes assigning the plurality of input identifiers to equivalent stored identifiers for comparison.

Preferably, the step of comparing the plurality of input identifiers and stored identifiers, in order to establish the one or more destination match estimates, includes determining a likelihood that the plurality of input identifiers correspond to the equivalent stored identifiers. Preferably, the step of determining the likelihood that the plurality of input identifiers correspond to the equivalent stored identifiers includes determining the similarities and/or differences between the plurality of input identifiers and the equivalent stored identifiers.

Preferably, the step of comparing the plurality of input identifiers and stored identifiers, in order to establish the one or more destination match estimates, includes combining the likelihoods that the plurality of input identifiers correspond to the equivalent stored identifiers.

Preferably, the step of identifying the payload destination, based on the one or more destination match estimates, includes determining the highest estimate amongst the machine match estimates.

Preferably, the method further includes the step of estimating a payload delivery portion delivered to the payload destination. Preferably, the payload destination is the machine.

Preferably, the step of estimating a payload delivery portion delivered to the payload destination includes:

receiving one or more delivery inputs from the one or more sensors, the delivery inputs associated with the payload after delivery to the payload destination; and estimating the delivery portion based on the one or more delivery inputs.

Preferably, the one or more delivery inputs from the one or more sensors are in the form of visual inputs. Preferably, the visual inputs are in the form of a dumped location of the payload or portions thereof.

Preferably, the step of estimating the delivery portion based on the one or more delivery inputs includes comparing the one or more delivery inputs with one or more of the plurality of inputs.

Preferably, the method further includes the step of determining a dumping productivity factor from the payload delivery portion. Preferably, the dumping productivity factor relates to unproductive payload portions that are not delivered to the payload destination. For example, the dumping productivity factor relates to unproductive payload portions that are not delivered to the machine. In a further form, the dumping productivity factor relates to one or more payloads delivered to the non-productive payload destination.

Preferably, the method further includes the step of calculating a total payload weight delivered to the payload destination. Preferably, the total payload weight delivered to the payload destination is based on one or more payload delivery portions. Preferably, the step of calculating the total payload weight delivered to the payload destination in the form of the machine includes determining when a final payload is delivered to the machine. Preferably, after the final payload is delivered to the machine, the method further includes moving the machine to the destination of the payload.

Preferably, the method further includes the step of indicating an alarm when the total payload weight delivered to the machine exceeds a predetermined maximum payload weight.

Preferably, the method further includes the step of recording the total payload weights delivered to the machine in order to establish a total payload weight delivered to the subsequent payload destination.

Preferably, the method further includes establishing a payload destination productivity factor from the total payload weight delivered to the subsequent payload destination.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
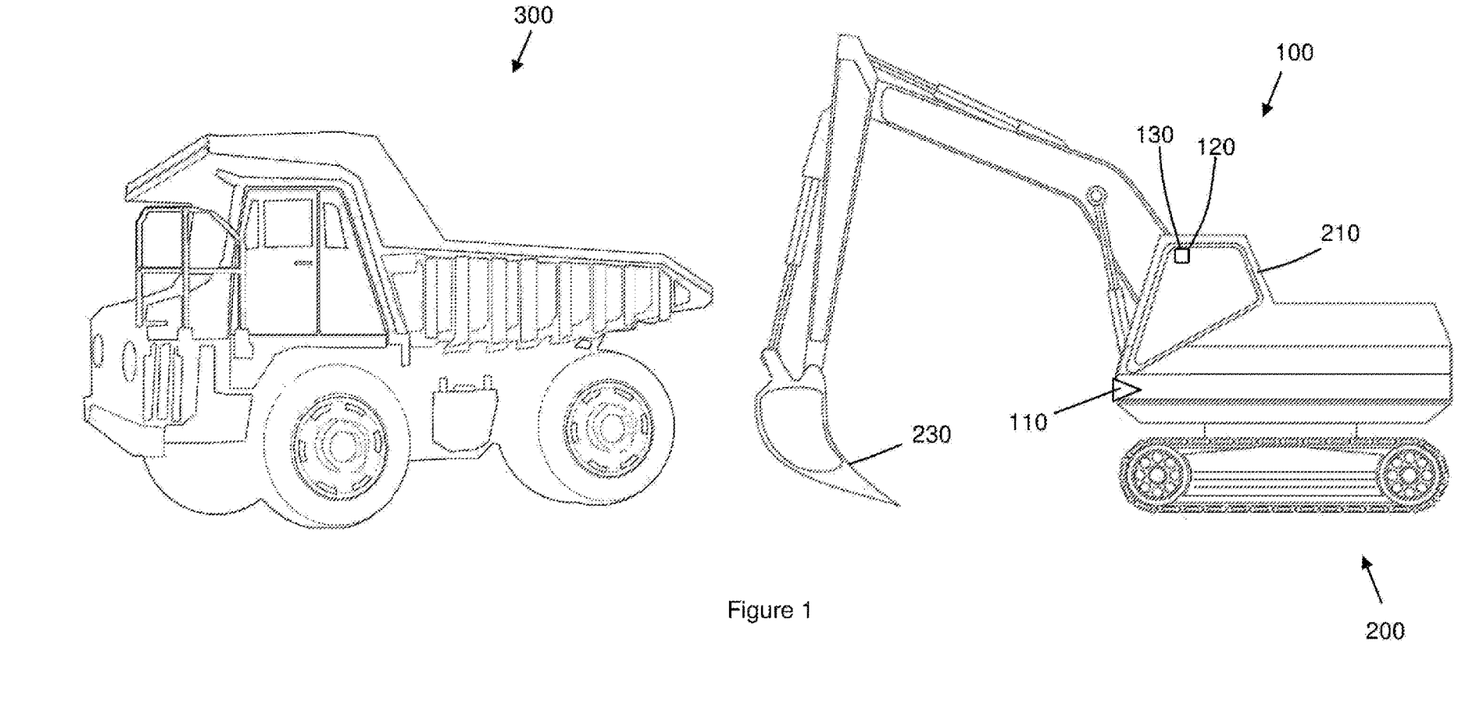
FIG. 1 illustrates a system of identifying a payload destination, in accordance with an embodiment of the invention, fitted to an excavator.

FIG. 1 illustrates a system 100 of identifying a payload destination, in accordance with an embodiment of the invention, that has been fitted to a lifting machine in the form of an excavator 200. It would be appreciated that the system 100 may be fitted to other lifting equipment including a backhoe or crane.

The system 100 includes sensors 110 and an identifying module 120. The system 100 also includes a user interface 130 and an alarm.

The sensors 110 include a visual sensor, an audio sensor, a movement sensor, and a wireless receiver. The sensors 110 are located on the excavator 200. The sensors 110 are in communication with the identifying module 120. It would be appreciated that the sensors 110 may be in wired or wireless communication with the identifying module 120.

The identifying module 120 is located in a cab 210 of the excavator 200. The identifying module 120 is configured to receive a plurality of inputs from the sensors 110. The plurality of inputs are associated with payload delivery from the excavator 200. The plurality of inputs from the sensors 110 define a plurality of input identifiers. In this embodiment, the identifying module 120 defines, with the plurality of inputs from the sensors 110, a movement identifier, a visual input identifier, an audio input identifier and a wireless communication input identifier.

The identifying module 120 is configured to identify and record stored identifiers from a number of payloads, trucks including the truck 300 and environment layouts. The stored identifiers include an equivalent identifier to the plurality of input identifiers for comparison. That is, in this embodiment, the stored identifiers include equivalent stored movement identifiers, stored visual identifiers, stored audio input identifiers and stored wireless communication identifiers.

The identifying module 120 is configured to compare plurality of input identifiers and stored identifiers in order to establish one or more destination match estimates. In comparing the plurality of input identifiers and stored identifiers, the identifying module 120 is configured to assign the plurality of input identifiers to stored identifiers that are equivalent in form. The identifying module 120 is also configured to determine a likelihood that the plurality of Input identifiers correspond to the stored identifiers that are equivalent in form. For example, in view of the differences between the movement input identifier and equivalent stored movement identifiers, the identifying module 120 determines a likelihood that there is a match therebetween and that the payload will be delivered to the truck 300.

The identifying module 120 is configured to combine the likelihoods that the plurality of input identifiers correspond to stored identifiers that are equivalent in form in order to establish one or more destination match estimates. To this end, the identifying module 120 is configured to determine the payload destination based on which destination match estimate is the highest (i.e. most likely) out of the one or more destination match estimates. As would be appreciated, the identifying module 120 may determine a number of payload destinations in order to monitor productivity. For example, the identifying module 120 may initially assign the payload destination as the truck 300 and, from the plurality of inputs, also identify that the payload will travel to a collection site with the truck 300.

The identifying module 120 is also configured to estimate a payload delivery portion delivered to the machine (i.e. the truck 300). In estimating the payload delivery portion, the identifying module 120 is configured to receive one or more delivery inputs from the one or more sensors 110; and estimate the delivery portion based on the one or more delivery inputs. The one or more delivery inputs are in the form of visual inputs in this embodiment. The visual inputs are in the form of the dumped location of the payload or portions thereof.

It would be appreciated that the payload delivery portion takes into account the amount of payload delivered to the truck 300 as opposed to, for example, payload that misses the truck 300 and lands on the ground. Accordingly, from the payload delivery portion, the identifying module 120 is configured to determine a dumping productivity factor (i.e. how much payload is delivered to the truck 300 or on the ground adjacent thereto). In addition, in the case where the excavator 200 is delivering payloads to two trucks either side, for example, by identifying the payload destination and the payload delivery portion, it can be established what payloads have been delivered to each truck.

The identifying module 120 is also configured to calculate a payload weight in a bucket 230 of the excavator 200 and, as outlined below, a total payload weight delivered to the truck 300. The total payload weight delivered to the machine is based one or more payload delivery portions. Furthermore, the identifying module 120 indicates, via the alarm, when a maximum total payload weight has been exceeded in the truck 300.

The identifying module 120 records the total payload weight delivered to the truck 300 in order to establish a total payload delivered to the destination in the form of a collection site. This allows a payload destination productivity factor be established which provides an indication on how efficiently payloads are being moved by the excavator 200, to the truck 300 and then to the collection site (i.e. the final end point of the payload).

The user interface 130 is located in the cab 210 of the excavator 200. The user interface 130 includes a touchscreen display and an audio output in the form of a speaker. The alarm is indicated through the user interface 130 in this embodiment. The alarm includes a visual alarm and an audio alarm. The visual alarm is indicated through the touchscreen display. The audio alarm is communicated through the speaker of the user interface 130. The alarm is triggered when the total payload weight delivered to the machine exceeds a predetermined maximum payload weight of the truck 300.

Figure 2:
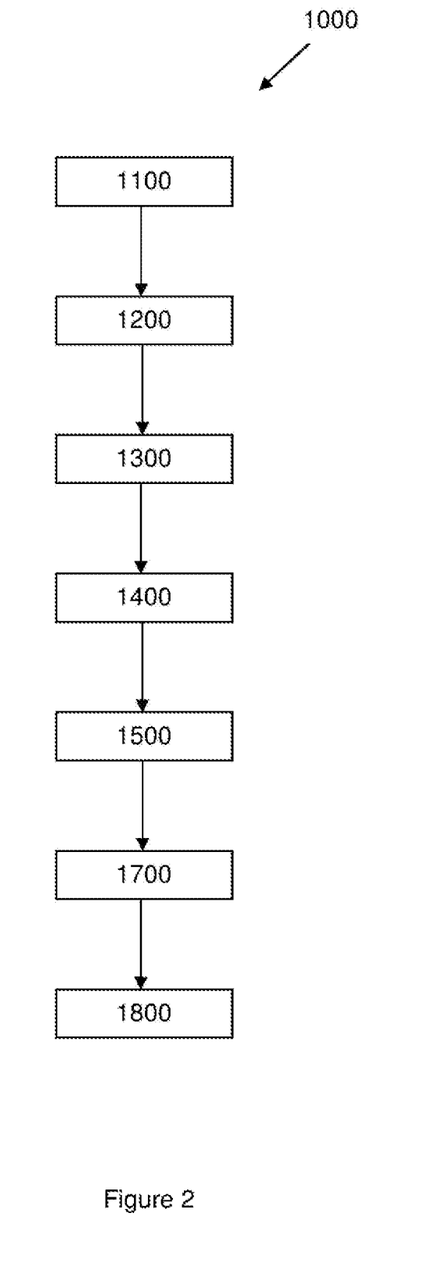
FIG. 2 illustrates a flow chart of a method of identifying a payload destination with reference to FIG. 1.

FIG. 2 illustrates a method 1000 of identifying a payload destination with reference to the items in FIG. 1 including the system 100.

At step 1100, the identifying module 120 initially gathers stored identifiers. In the step of gathering the stored identifiers, the identifying module 120 records a stored movement identifier, a stored visual input identifier and a stored wireless communication input identifier from a number of trucks. It would be appreciated that a stored audio input identifier may also be recorded but the above identifiers will be used in this embodiment. Furthermore, identifiers may be recorded from the payload and/or environment layouts.

The stored movement identifiers in this embodiment includes a delivery height to a truck. The stored visual input identifiers include visual images of trucks during dumping of a payload. The stored wireless communication input identifiers includes a signal from a passive identification device.

It would also be appreciated that in an alternative embodiment, the identifying module 120 gathers the stored identifiers by, for example, having the stored identifiers uploaded onto the identifying module 130 by a user.

The stored identifiers have an equivalent input identifier for comparison, as outlined below. In addition, whilst gathering the stored identifiers, or shortly thereafter, a user records the maximum total payload weight associated with each truck, including the truck 300, via the user interface 130.

At step 1200, the excavator 200 picks up a payload.

At step 1300, the identifying module 120 defines a plurality of input identifiers based on a plurality of inputs received from the sensors 110. That is, from the plurality of inputs received from the sensors 110, the identifying module 120 defines input identifiers that include a movement input identifier, a visual input identifier and a wireless communication input identifier.

The movement input identifier includes a height of payload at dumping. The visual input identifier includes a visual image of the truck 300 during dumping of the payload. The wireless communication input identifier includes a signal from a passive identification device on the truck 300. It would be appreciated that the plurality of input identifiers may be defined at any time the exactor 200 delivers the payload to the truck 300.

At step 1400, the identifying module 120 compares the plurality of input identifiers and stored identifiers in order to establish an initial destination match estimate and a subsequent destination match estimate. It would be appreciated that the initial and subsequent destination match estimates allow the (final) payload destination to be determined.

In comparing the plurality of input identifiers and stored identifiers, the identifying module 120 assigns the plurality of input identifiers to an equivalent stored identifier for comparison. For example, the identifying module 120 assigns the height of payload at dumping for comparison with the delivery height to the trucks. Similarly, the identifying module 120 assigns the visual image of the truck 300 to visual images of the trucks during dumping of the payload.

The identifying module 120 then compares the plurality of input identifiers to their equivalent stored identifiers in order to determine a likelihood that the plurality of input identifiers correspond to the equivalent stored identifiers. That is, for example, the height of the payload at dumping is compared with the delivery height to trucks including truck 300. From the similarities or differences therebetween, the likelihood that the movement input identifier matches the stored movement identifier is determined. Similarly, the likelihoods that the visual image and passive identification signal defined as input identifiers match their equivalent stored identifiers from the number of trucks, including the truck 300, are also determined.

Following the above, the identifying module 120 then combines the likelihoods that the plurality of input identifiers correspond to the equivalent stored identifiers to determine the destination match estimates. As would be appreciated by a person skilled in the art, one destination match estimate corresponds to, for example, a probability that the payload will be delivered to a particular destination in view of the plurality of input identifiers and stored identifiers.

At step 1500, the identifying module 120 determines the payload destination based on the destination match estimates. In particular, the identifying module 120 determines the highest estimate amongst the destination match estimates. As would be appreciated, the highest estimate (i.e. highest probability) is indicative of the correct destination being identified.

In this embodiment, the identifying module 120 initially establishes that the payload is being delivered to the truck 300 by identifying that the height of the payload at dumping matches the delivery height to the truck 300. Furthermore, the visual image of the truck 300 assists in identifying that the payload is being delivered thereto.

In addition, from the wireless communication input identifier, the identifying module 120 is able to identify that the payload delivered to the truck 300 will be delivered to collection site A. Collection site A is associated with the wireless communication input identifier from truck 300. Accordingly, the (final) payload destination is established as collection site A.

In a further form, it would be appreciated that determining the payload destination based on the truck may be carried out by, for example, a delivery time of the truck 300. That is, the identifying module 140 may record a pick-up time in the form of when the payload, from the excavator 200, is delivered to the truck 300. The pick-up time is established via the sensors 110. Following this, the identifying module 140 records a further pick-up time in the form of when the truck 300 returns to collect a further payload. The identifying module 140 may then determine a delivery time based on the pick-up time and the further pick-up time. The identifying module 140 determines the destination of the payload based on the delivery time. For example, if the delivery time was 30 minutes, the identifying module 140 may assign the payload destination as collection site A, which has a delivery time of approximately 30 minutes.

At step 1600, the identifying module estimates a payload delivery portion delivered to the truck 300. The step of estimating a payload delivery portion delivered to the truck 300 includes receiving one or more delivery inputs from the one or more sensors 110, the one or more delivery inputs associated with the payload after delivery to the machine. The one or more delivery inputs, in this embodiment, are in the form of a dumped location of the payload, or portions thereof, after delivery to the truck 300. The identifying module 140 estimates the delivery portion based on the one or more delivery inputs.

To this end, in the case where the excavator 200 is delivering payloads to two trucks together, it would be appreciated that by identifying the payload destination and the payload delivery portion, it can be established what payloads have been delivered to each truck.

At step 1700, the method further includes the step of calculating a total payload weight delivered to the truck 300. In this embodiment, the total payload weight delivered to the truck 300 is based on a sum of payload delivery portions delivered to the truck 300 by the excavator 200.

Optionally, at step 1700, when the total payload weight delivered to the truck 300 exceeds a predetermined payload weight, relative to the maximum total payload weight for the truck 300, an alarm alerts a user. A visual alarm is communicated through the touch-screen display of the user interface 130. An audio alarm is communicated through the speaker of the user interface 130. The alarm allows the user to take appropriate action to avoid overloading the truck 300.

At step 1800, the method further includes the step of recording the total payload weights delivered to the truck 300 in order to establish a total payload delivered to the destination. This allows a payload destination productivity factor to be determined which gives an indication of how efficiently payloads are being delivered from the excavator 200, to the truck 300 and then to the destination of the payload in the form of collection site A.

The step of calculating the total payload weight delivered to the truck 300 includes determining when a final payload is delivered to the truck 300. In this embodiment, the final payload weight delivered to the truck 300 is determined by identifying when a new wireless communication input identifier is detected by the one or more sensors 110. As would be appreciated, a new wireless communication input identifier typically indicates that an empty truck has arrived and the final payload has been delivered to the truck 300. In the case where two trucks are being loaded together, the visual input identifiers may, for example, assist in determining when a new truck has arrived.

The system 100 and method 1000 allows the payload destination to be established, without complex and expensive communication equipment in the excavator 200 and the truck 300.

Furthermore, the system 100 and method 1000 allow a payload delivery portion to be established. The payload delivery portion assists in determining a dumping productivity factor, which gives an indication of how effectively an operator is delivering payloads to a truck 300.

Similarly, by recording the total payload weight being delivered to the truck 300, it can be determined whether the truck 300 is be underutilised and whether it is, for example, delivering the payload efficiently to a further collection site. This allows a payload destination productivity factor to be established. Furthermore, payload destination productivity factor may indicate the truck is waiting too long to receive payloads.

In addition, by recording the total payload weight being delivered to the truck 300, it can be established whether the truck 300 is being underloaded or overloaded. This allows, with corrective action, productivity to be increased when the truck 300 is underloaded, or safety to be increased when the truck 300 is overloaded.

Furthermore, the system 100 and method 1000 also provide a commercial advantage as communication systems do not have to be fitted or retrofitted to each truck.

Moreover, as the system 100 and method 1000 uses a variety of inputs to determine destination of the payload, this increases the reliability and accuracy by which the destination is determined. For example, if interference with the passive wireless indicators were to occur, the identity of the truck 300 may still be accurately determined through, for instance, using the visual identifier.

The user interface 130 also provides a convenient way for the user to communicate and program the identifying module 120. Moreover, the alarm appropriately alerts the user to take corrective action, when the truck 300 is overloaded.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The claims defining the invention are as follows:

1. A system of identifying a payload destination, the system including:
   one or more sensors located on a lifting vehicle; and
   an identifying computing unit configured to:
      receive a plurality of inputs from the one or more sensors, the plurality of inputs being associated with payload delivery from the lifting vehicle;
      define a plurality of input destination identifiers based on the plurality of inputs, wherein the plurality of input destination identifiers include a movement identifier, a visual input identifier, an audio input identifier or a wireless communication input identifier;
      compare the plurality of input destination identifiers with stored identifiers in order to establish one or more destination match estimates; and
      identify the payload destination based on the one or more destination match estimates.

2. The system of claim 1, wherein the identifying computing unit is configured to estimate a payload delivery portion delivered to the payload destination.

3. The system of claim 2, wherein in estimating the payload delivery portion, the identifying computing unit is configured to:
   receive one or more delivery inputs from the one or more sensors, the one or more delivery inputs associated with the payload after delivery to the payload destination; and
   estimate the delivery portion based on the one or more of the plurality of inputs and the one or more delivery inputs.

4. The system of claim 2, wherein the identifying computing unit is configured to determine a dumping productivity factor from the payload delivery portion, wherein the dumping productivity factor relates to payload delivered to the payload destination or on the ground adjacent thereto.

5. The system of claim 1, wherein the payload destination is initially in the form of a machine or other productive destination.

6. The system of claim 5, wherein the identifying computing unit is configured to calculate a total payload weight delivered to the machine.

7. The system of claim 6, wherein the identifying computing unit is configured to calculate the total payload weight delivered to the machine by determining when a final payload is delivered to the machine.

8. The system of claim 6, wherein the identifying computing unit records the total payload weight delivered to the machine in order to establish a total payload delivered to the payload destination.

9. The system of claim 6, wherein the identifying computing unit indicates, via an alarm, when a predetermined maximum payload weight of the machine has been exceeded based on the total payload weight delivered to the machine.

10. The system of claim 1, wherein the one or more sensors include an audio sensor, a visual sensor, a movement sensor and/or a wireless receiver.

11. The system of claim 1, wherein the identifying computing unit is configured to gather the stored identifiers from payloads, machines and/or environment layouts.

12. The system of claim 1, wherein the comparison between the plurality of input identifiers and stored identifiers includes assigning the plurality of input identifiers to the stored identifiers that are equivalent in form.

13. The system of claim 12, wherein the comparison between the plurality of input identifiers and stored identifiers includes determining a likelihood that the plurality of input identifiers correspond to the stored identifiers that are equivalent in form.

14. The system of claim 13, wherein the identifying computing unit is configured to combine the likelihoods that the plurality of input identifiers correspond to the stored identifiers that are equivalent in form in order to establish the one or more destination match estimates.

15. The system of claim 14, wherein the identifying computing unit determines the payload destination based on the highest estimate amongst the one or more destination match estimates.

16. The system according to claim 1, wherein the payload destination is in the form of a collection site.

17. A method of machine identification, the method including the steps of:

defining a plurality of input identifiers based on a plurality of inputs received from one or more sensors located on a lifting vehicle, the plurality of inputs being associated with payload delivery from the lifting vehicle, wherein the plurality of input identifiers include a movement identifier, a visual input identifier, an audio input identifier or a wireless communication input identifier;

comparing the plurality of input identifiers and stored identifiers in order to establish one or more destination match estimates; and identifying the payload destination based on the one or more destination match estimates.

18. The method of claim 17, wherein the step of defining the plurality of input identifiers based on the plurality of inputs received from the one or more sensors includes defining a movement identifier, a visual input identifier, an audio input identifier and/or a wireless communication input identifier.

19. The method of claim 17, wherein the method further includes the step of estimating a payload delivery portion delivered to the payload destination, the payload destination initially being in the form of a machine or other productive destination.

20. The method of claim 19, wherein the step of estimating a payload delivery portion delivered to the machine or other productive destination includes:

receiving one or more delivery inputs from the one or more sensors, the delivery inputs associated with the payload after delivery to the machine or other productive destination; and estimating the delivery portion based on the one or more delivery inputs.

21. The method of claim 17, the method further including the step of calculating a total payload weight delivered to the payload destination.

* * * * *